May 7, 1929.  C. C. LIMBARTH  1,712,043
METHOD FOR TREATING TEETH AND ARTIFICIAL DENTURES WITH COLOR FILMS
Filed July 30, 1925
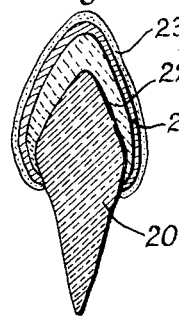
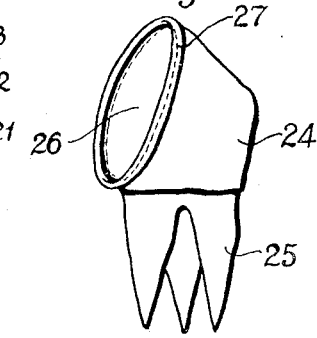
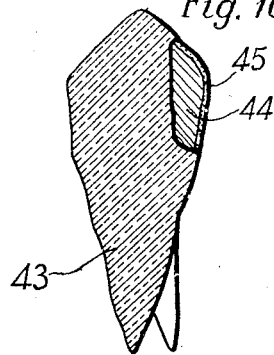
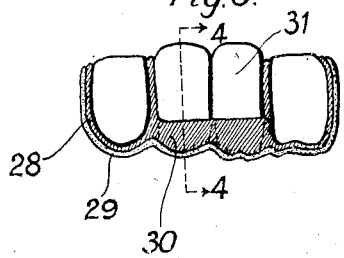
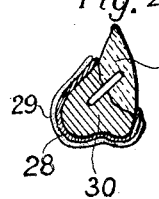
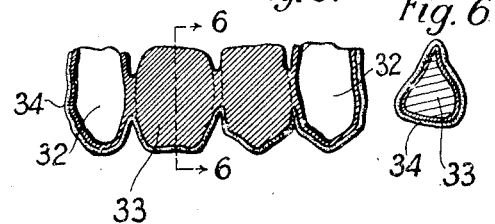
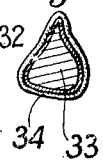
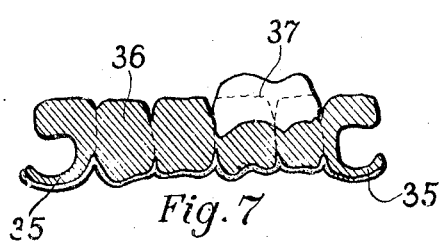
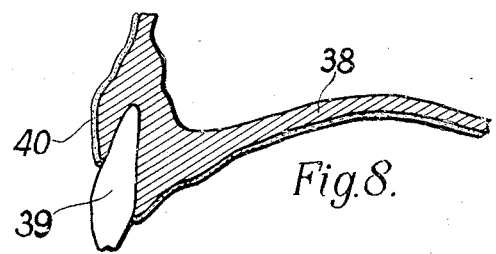
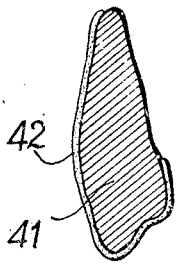
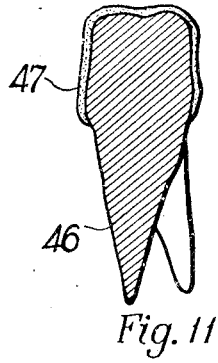
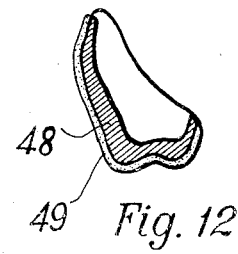
Dr. Charles C. Limbarth
Inventor
By his Attorney Julian␣␣Writal Patented May 7, 1929.

1,712,043

UNITED STATES PATENT OFFICE.

CHARLES C. LIMBARTH, OF BROOKLYN, NEW YORK.

METHOD FOR TREATING TEETH AND ARTIFICIAL DENTURES WITH COLOR FILMS.

Application filed July 30, 1925. Serial No. 47,137.

My invention relates to a method for covering teeth and artificial dentures with a color film so as to make them resemble the color of the natural teeth and gum, respectively, of the person so treated. My novel color film on said teeth, dentures, or artificial tooth restorations may be made as a layer of coloring material, such as enamel, paint, and the like, resembling the color of the natural teeth or gums.

My invention is also desirable where crown and bridgework has become dulled or tarnished and is particularly essential to successful "takes" in camera or photographic work of actors, actresses, singers, speakers and other artists.

In carrying out my invention I may apply a film or layer of opaque light material to the outer face of a metal crown, or I may apply the film to the entire surface, and I may do the same to the bridge bar of a bridge denture as well as to the exposed portion or even to all of the surfaces of a plate.

In the accompanying drawings I have illustrated different practical embodiments of the invention, but the constructions shown therein are to be understood as illustrative only, and not as defining the limits of the invention.

Similar reference characters are employed to denote corresponding parts in the several views, in which:—

Fig. 1 is a cross sectional view of a crown work on a tooth with my color film applied to the same, Fig. 2 is a side view of modified form of applying my color film to a metallic crown, Fig. 3 is a longitudinal sectional view of a bridgework with a color film thereon, Fig. 4 is a cross sectional view of the construction shown in Fig. 3, the section being taken on the line 4—4 of Fig. 3, Figs. 5 and 6 show a solid metal dental bridge and a cross section thereof, Fig. 7 shows a removable bridge treated according to my novel method, and Fig. 8 is a cross sectional view of a dental plate similarly treated.

Fig. 9 is a cross section through an artificial tooth covered by a color film.

Fig. 10 shows a section through a natural tooth with a metal inlay treated with a color film, while Fig. 11 is a sectional view of a natural tooth the appearance of which has been improved by a color film, and Fig. 12 shows a similarly treated hollow metal shell shaped like a tooth.

Referring to the drawings, I show in Fig. 1, at 20, a natural tooth, prepared to receive a metal, or other rigid material, crown shell 21, secured in place by dental cement or other adhesive substance 22, and in carrying out my invention, and in the form of construction shown in Fig. 1, I apply by any appropriate methods a color film, or layer 23, of enamel, paint or other opaque substance of a shade or tint to match or resemble the natural teeth of the individual patient. The color film in this case is applied over the entire face of the crown 21. For example, the enamel composition comprising nitro-cellulose in solution in a suitable solvent and containing the proper tinting substances may be employed for the purpose.

In Fig. 2 of the drawings, I show a crown shell 24, on a tooth 25, said shell having only the exposed outside or front portion of its surface treated with my color film as at 26. The treated area has a ledge or bead 27 made by the material of the shell around it which protects the edges of said film where its breaking off would most probably start. This protecting ledge will result in a hollow recess for receiving the coloring layer and is especially valuable in case said layer is made of enamel.

Figs. 3 and 4 show, in longitudinal and in cross section respectively, a usual dental bridge made of metal with inserted porcelain tooth imitation and with my color film applied to all of its outside metal surface. The character 28 indicates the shell, 29 the color film, 30 the solid gold or other metal bar of the bridge, and 31 the porcelain tooth facings.

In Figs. 5 and 6, I show an all metal bridge, all of its outside surface being covered by my color film. The characters 32 indicate the shell portion, 33 the solid bar, 34 the color film.

Fig. 7 shows a removable bridge in which the portions marked 35 are the metal attachment rings covered by a color film to match the individual teeth which they are intended to grip. 36 indicates the body of the bridge, and 37 is the part replacing a missing gum structure which may be covered with a color film of some pink tint to match the color of the gum.

Fig. 8 is a cross section through a dental plate of gold or other material, in which 38 is the plate, 39 a tooth secured therein, 40 the color film.

Fig. 9 shows in cross section a solid artificial tooth made of metal or other suitable material, 41, and covered by the color film 42.

Fig. 10 is a cross section through a natural tooth 43 with a gold inlay 44 and a color film 45 thereon to match the appearance of the rest of the tooth.

In Fig. 11 I show in cross section a healthy, intact natural tooth 46, the appearance of which has been improved by a color film 47, while Fig. 12 finally represents a hollow metal shell 48 shaped like a tooth being treated with the color film 49.

I want to emphasize that the terms and expressions employed are used as terms of description and not of limitation and I have no intention, in the use of such terms and expressions, of excluding any equivalents of the features shown and described, but recognize that further embodiments may be possible within the scope of the invention claimed.

What I claim as new and desire to secure by Letters Patent, is:—

1. The method of treating a denture permanently fixed in the mouth and having a visible metal surface, which consists of painting upon said metal surface a film or layer of opaque material of color shaded or tinted to resemble natural teeth for the individual patient.

2. The method of treating a tooth having a non-natural colored surface and fixed in the mouth, which consists in painting upon said unnaturally colored surface a film or layer of inert material of color shaded or tinted to resemble a natural tooth for the individual patient.

Signed at Brooklyn, in the county of Kings, and State of New York, April, A. D. 1925.

Dr. CHARLES C. LIMBARTH.